United States Patent
Owens et al.

(10) Patent No.: US 7,616,745 B2
(45) Date of Patent: Nov. 10, 2009

(54) METHOD FOR PRINTING INCOMING FACSIMILES

(75) Inventors: Brian K. Owens, Lexington, KY (US);
Douglas L. Robertson, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 988 days.

(21) Appl. No.: 11/082,083

(22) Filed: Mar. 16, 2005

(65) Prior Publication Data
US 2006/0209355 A1    Sep. 21, 2006

(51) Int. Cl.
*H04M 11/00* (2006.01)
(52) U.S. Cl. ............... 379/100.01; 379/100.08; 379/100.09; 379/90.01
(58) Field of Classification Search ......... 379/100.01, 379/100.08, 100.09, 100.12, 100.13, 100.15, 379/100.17, 90.01; 358/400, 434, 440, 1.9
See application file for complete search history.

(56) References Cited

U.S. PATENT DOCUMENTS

| | | | |
|---|---|---|---|
| 5,200,993 A | 4/1993 | Wheeler et al. | |
| 5,351,136 A | 9/1994 | Wu et al. | |
| 5,388,150 A | 2/1995 | Schneyer et al. | |
| 5,436,961 A | 7/1995 | Kobayashi | |
| 5,440,617 A | 8/1995 | Rynaski et al. | |
| 5,455,861 A | 10/1995 | Faucher et al. | |
| 5,519,507 A * | 5/1996 | Subramaniam et al. | 358/402 |
| 5,638,426 A | 6/1997 | Lewis | |
| 5,661,787 A | 8/1997 | Pocock | |
| 5,812,278 A | 9/1998 | Toyoda et al. | |
| 5,844,970 A | 12/1998 | Hsu | |
| 5,848,137 A * | 12/1998 | Hsiao | 379/110.01 |
| 6,041,114 A | 3/2000 | Chestnut | |
| 6,205,205 B1 | 3/2001 | Goldberg et al. | |
| 6,498,837 B1 | 12/2002 | Baba | |
| 6,546,085 B1 | 4/2003 | Brockman et al. | |
| 6,580,787 B1 | 6/2003 | Akhteruzzaman et al. | |
| 6,647,099 B1 | 11/2003 | Durkin | |
| 6,728,346 B2 | 4/2004 | Czyszczewski et al. | |
| 6,763,092 B1 | 7/2004 | Borland | |
| 2002/0018546 A1 | 2/2002 | Horne | |
| 2003/0081742 A1 | 5/2003 | Czyszczewski et al. | |
| 2004/0051910 A1 * | 3/2004 | Nakahara | 358/400 |
| 2004/0131164 A1 | 7/2004 | Gould | |
| 2004/0161085 A1 | 8/2004 | Horne | |
| 2004/0190697 A1 | 9/2004 | Lee et al. | |
| 2004/0207884 A1 | 10/2004 | Chen | |
| 2004/0234052 A1 | 11/2004 | Lebowitz et al. | |
| 2004/0252349 A1 | 12/2004 | Green et al. | |
| 2005/0012966 A1 | 1/2005 | Mitchell et al. | |

* cited by examiner

*Primary Examiner*—Melur Ramakrishnaiah
(74) *Attorney, Agent, or Firm*—Taylor & Aust, PC

(57) ABSTRACT

A method for printing incoming facsimiles assigns a print-priority number to a plurality of known facsimile origination identification numbers, wherein the print-priority number is different for at least two of the plurality. The method also identifies the facsimile origination identification number of incoming facsimiles. The method also stores the incoming facsimiles if from a known facsimile origination identification number assigned one of at least two different print-priority numbers. The method also prints the stored facsimiles in an order based at least on their corresponding print-priority numbers.

22 Claims, 1 Drawing Sheet

METHOD FOR PRINTING INCOMING FACSIMILES

CROSS REFERENCES TO RELATED APPLICATIONS

This patent application is related to the U.S. patent application Ser. No. 10/620,202, filed Jul. 14, 2003, entitled "Method for Blocking Unwanted Facsimiles" and assigned to the assignee of the present application.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Invention

The present invention relates generally to facsimile operations, and more particularly to a method for printing incoming facsimiles.

2. Description of the Related Art

Known facsimile machines include those which identify an originating phone number from which the facsimile originates and which route the facsimile to an E-mail location, to a storage medium, or to a selected output slot on a facsimile device based on the identified originating phone number of the facsimile. Caller ID information or calling number delivery information is used to determine the source or originating phone number of the facsimile. Other known facsimile machines include those which block unwanted facsimile transmissions. These machines receive a signal indicative of a facsimile transmission from a potential transmitting sender, determine whether the potential transmitting sender is an authorized sender from the caller ID or the transmission subscriber identification (message header) of the proposed facsimile transmission, and block, refuse or terminate the facsimile transmission if the transmitting sender is an unauthorized sender or is not an authorized sender.

SUMMARY OF THE INVENTION

A first method for printing incoming facsimiles assigns a print-priority number to a plurality of known facsimile origination identification numbers, wherein the print-priority number is different for at least two of the plurality. The first method also identifies the facsimile origination identification number of incoming facsimiles. The first method also stores the incoming facsimiles if from a known facsimile origination identification number assigned one of at least two different print-priority numbers. The first method also prints the stored facsimiles in an order based at least on their corresponding print-priority numbers.

A second method for printing incoming facsimiles assigns a print-priority number to a plurality of known facsimile origination identification numbers, wherein the print-priority number is different for at least two of the plurality. The second method also identifies the facsimile origination identification number of incoming facsimiles. The second method also stores the incoming facsimiles if from a known facsimile origination identification number assigned one of at least two different print-priority numbers, wherein the storing of the incoming facsimiles is performed during a predetermined hold time period. The second method also prints the stored facsimiles in an order based at least on their corresponding print-priority numbers, wherein the printing of the stored facsimiles is performed at the end of the predetermined hold time period or earlier upon user request.

A third method for printing incoming facsimiles assigns a print-priority number to a plurality of known facsimile origination identification numbers, wherein the print-priority number is different for at least two of the plurality. The third method also identifies the facsimile origination identification number of incoming facsimiles. The third method also stores the incoming facsimiles if from a known facsimile origination identification number assigned one of at least two different print-priority numbers, wherein the storing of the incoming facsimiles is performed during a predetermined hold time period. The third method also prints the stored facsimiles in an order based at least on their corresponding print-priority numbers, wherein the printing of the stored facsimiles is performed at the end of the predetermined hold time period, wherein the printing of the stored facsimiles is performed automatically for the stored facsimiles corresponding to at least one of the print-priority numbers, and wherein the printing of the stored facsimiles is performed upon user request for the stored facsimiles corresponding to at least a different one of the print-priority numbers.

Several benefits and advantages are derived from at least one of the methods. In one example, wherein facsimiles are stored at night and stored facsimiles corresponding to higher print-priority numbers are printed at a preselected time in the morning before printing stored facsimiles corresponding to lower print-priority numbers, the more important faxes are printed first before the facsimile machine runs out of paper or other consumables. In one variation of the same example, having stored facsimiles corresponding to higher print-priority numbers print automatically at a preselected time in the morning and having stored facsimiles corresponding to lower (or no) print-priority numbers printed only upon user request allows facsimiles corresponding to lower (or no) print-priority numbers, such as unwanted facsimiles, not to be printed, thereby saving on consumables.

DETAILED DESCRIPTION

Figure 1:
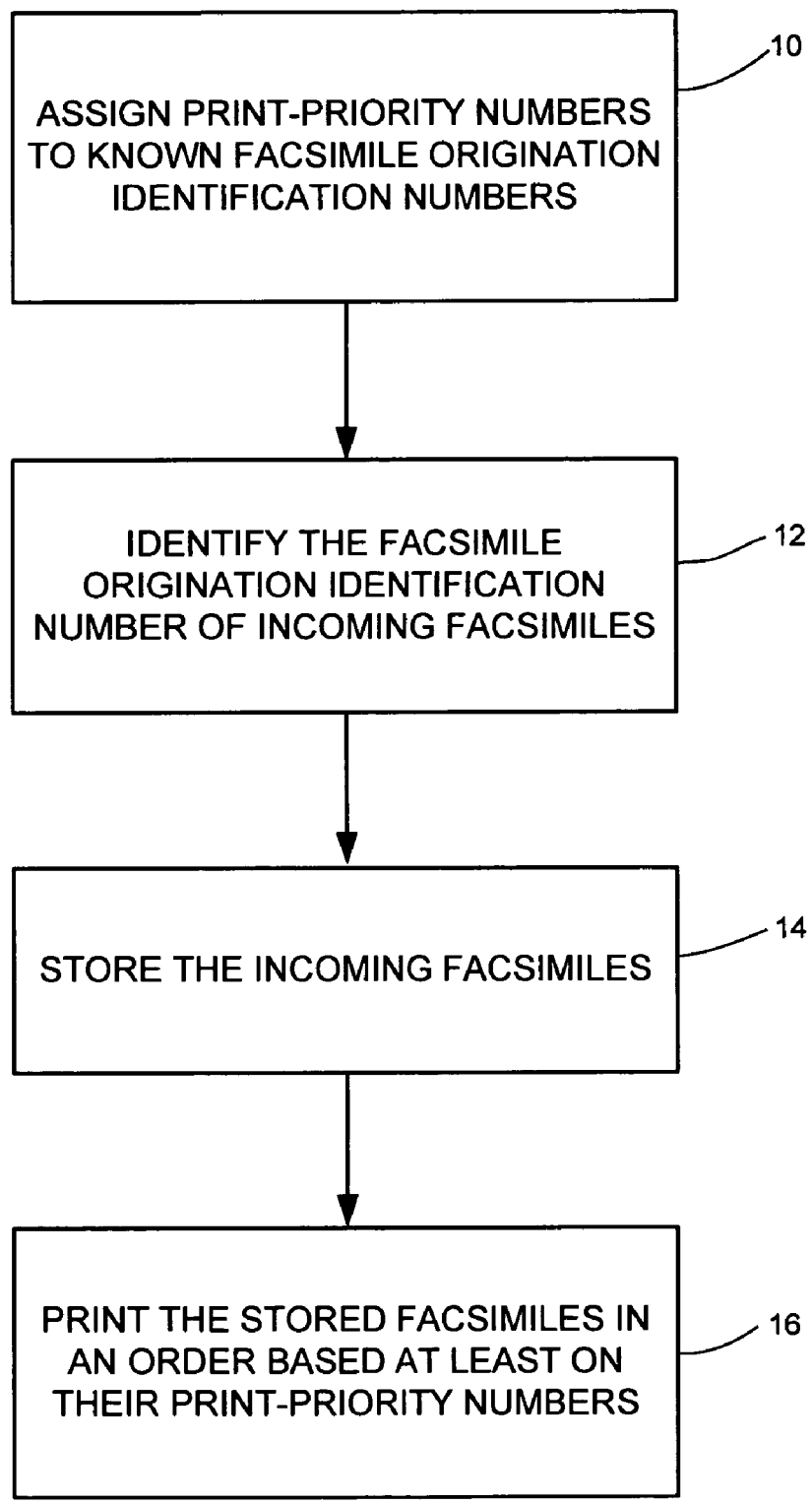
FIG. 1 is a block diagram of a method of the invention.

Referring to FIG. 1, a first method of the invention is for printing incoming facsimiles. The first method includes assigning a print-priority number to a plurality of known facsimile origination identification numbers, wherein the print-priority number is different for at least two of the plurality. This is indicated generally by block 10 of FIG. 1. The first method also includes identifying the facsimile origination identification number of incoming facsimiles, as is indicated by block 12 of FIG. 1. The first method also includes storing the incoming facsimiles if from a known facsimile origination identification number assigned one of at least two different print-priority numbers. This is indicated generally by block 14 of FIG. 1. The first method also includes printing the stored facsimiles in an order based at least on their corresponding print-priority numbers, as is indicated by block 16 of FIG. 1.

In one embodiment of the first method, the plurality is at least three. In one variation, a print-priority number of 0 or 1 is the highest print-priority number. In a different variation, a print-priority number of 0 or 1 is the lowest print-priority number.

In one application of the first method, incoming facsimiles are received by a facsimile machine. In another application, incoming facsimiles are received by the facsimile component of an all-in-one machine which has printing capability. In an additional application, incoming facsimiles are received by a facsimile modem of a computer which is connected to a printer. Other applications are left to the artisan.

In one implementation of the first method, the known facsimile origination identification numbers and corresponding assigned print-priority numbers are stored. In one usage, two or more different known facsimile origination identification numbers are assigned the same corresponding print-priority number. In one variation, the identified facsimile origination identification number of incoming facsimiles is compared to the stored known facsimile origination identification numbers to determine if there is a match, and incoming facsimiles are stored in association with the print-priority number corresponding to the matched stored known facsimile origination identification number. U.S. patent application Ser. No. 10/620,202, filed Jul. 14, 2003, entitled "Method for Blocking Unwanted Facsimiles" and assigned to the assignee of the present application, is incorporated herein by reference and discloses methods for compiling a listing of known facsimile origination identification numbers and for determining if the facsimile origination identification number of an incoming facsimile matches that of a compiled known facsimile origination identification number.

In another implementation, the known facsimile origination identification numbers are stored in an ordered list wherein there is a different print-priority position (which is the print-priority number) on the ordered list for each known facsimile origination identification number on the ordered list. In one deployment of the first method, a user can add a new known facsimile origination identification number to an existing print-priority list having one known facsimile origination identification number per print-priority number. In one variation, Up/Down arrows on an all-in-one machine are used to place the new known facsimile origination identification number in the correct order for print priority. In one modification, these arrows are used to move caller IDs up or down in priority on the print priority list.

In one illustration of the first method, incoming faxes are stored in a memory of a facsimile machine, an all-in-one machine, or a computer having a facsimile modem. In a different illustration, incoming faxes are converted into a JPEG image and stored on a hard drive, memory card, flash drive, etc. of a connected network device. Other illustrations are left to the artisan.

In one enablement of the first method, the facsimile origination identification number of the incoming facsimiles and the known facsimile origination identification numbers include caller ID information. In one variation, the caller ID information includes a caller telephone number and/or a name. In the same or a different enablement, the facsimile origination identification number of the incoming facsimiles and the known facsimile origination identification numbers include a facsimile header. In the same or a different enablement, the known facsimile origination identification numbers include at least one having at least one wildcard. In one variation, a known facsimile origination identification number includes a preselected three digit area code followed by a seven digit phone number, wherein the seven digits of the phone number are all wild cards. This will treat all incoming facsimiles from the preselected three digit area code the same according to the print-priority number assigned to the known facsimile origination identification number having the preselected three digit area code. Other variations are left to the artisan.

In one extension of the first method, there is also included automatically printing the stored facsimiles corresponding to at least one of the print-priority numbers in order to make room for storing additional incoming facsimiles. In one variation, some or all of the stored facsimiles associated with the highest print-priority number are printed when a predetermined memory storage limit has been met. In one modification of this variation, stored facsimiles associated with at least the lowest print-priority number are printed or deleted at user request. In a different variation, some or all of the stored facsimiles associated with the lowest print-priority number are printed when a predetermined memory storage limit has been met. Other variations are left to the artisan.

In the same or a different extension, there is also included storing the incoming facsimiles from unknown facsimile origination identification numbers. In one variation, there is included printing stored facsimiles from unknown facsimile origination identification numbers only at user request. In a different variation, there is included printing stored facsimiles from unknown facsimile origination identification numbers after all stored facsimiles from known facsimile origination identification numbers have been printed.

In one employment of the first method, the printing of the stored facsimiles is performed automatically for the stored facsimiles corresponding to at least one (e.g., the highest one) of the print-priority numbers and is performed upon user request for each stored facsimile corresponding to at least a different one (e.g., the lowest one) of the print-priority numbers.

In one example of the first method, the storing of the incoming facsimiles only stores a predetermined number of the most recent incoming facsimiles of each of at least one known facsimile origination identification number. In one variation, only the most recent incoming facsimile associated with a known facsimile origination identification number of a particular customer is stored, wherein the particular customer is known to place an order by facsimile and then to send updated orders by later facsimiles. Storing only the most recent incoming facsimiles from the particular customer conserves available storage space. By only storing the most recent incoming facsimile is meant that the previous stored facsimile is deleted from storage or is made available to be replaced (overwritten) in storage.

In one utilization of the first method, the printing of the stored facsimiles only prints a predetermined number of the most recent incoming facsimiles of each of at least one known facsimile origination identification number. In one variation, only the most recent stored facsimile associated with a known facsimile origination identification number of a particular customer is printed, wherein the particular customer is known to place an order by facsimile and then to send updated orders by later facsimiles. Printing only the most recent stored facsimile from the particular customer conserves printer consumables.

A second method of the invention is for printing incoming facsimiles. The second method includes assigning a print-priority number to a plurality of known facsimile origination identification numbers, wherein the print-priority number is different for at least two of the plurality. The second method also includes identifying the facsimile origination identification number of incoming facsimiles. The second method also includes storing the incoming facsimiles if from a known facsimile origination identification number assigned one of at least two different print-priority numbers, wherein the storing of the incoming facsimiles is performed during a predetermined hold time period. The second method also includes printing the stored facsimiles in an order based at least on their corresponding print-priority numbers, wherein the printing of the stored facsimiles is performed at the end of the predetermined hold time period or earlier upon user request. In one embodiment of the first method, the plurality is at least three.

In one enablement of the second method, the printing is performed automatically at the end of the predetermined hold time period for the stored facsimiles corresponding to at least one of the print-priority numbers. In one variation, the printing of the stored facsimiles is performed automatically at the end of the predetermined hold time period. Other automatic-printing enablements are left to the artisan.

In one employment of the second method, the printing of the stored facsimiles is performed upon user request at the end of the predetermined hold time period for the stored facsimiles corresponding to at least one of the print-priority numbers. In one variation, the printing of the stored facsimiles is performed upon user request at the end of the predetermined hold time period. Other user-request-printing employments are left to the artisan.

In one application of the second method, the predetermined hold time period begins at the close of one business day and ends at the beginning of the next business day. It is noted that the previously described examples, illustrations, etc. of the first method are equally applicable to the second method.

A third method of the invention is for printing incoming facsimiles. The third method includes assigning a print-priority number to a plurality of known facsimile origination identification numbers, wherein the print-priority number is different for at least two of the plurality. The third method also includes identifying the facsimile origination identification number of incoming facsimiles. The third method also includes storing the incoming facsimiles if from a known facsimile origination identification number assigned one of at least two different print-priority numbers, wherein the storing of the incoming facsimiles is performed during a predetermined hold time period. The third method also includes printing the stored facsimiles in an order based at least on their corresponding print-priority numbers, wherein the printing of the stored facsimiles is performed at the end of the predetermined hold time period, wherein the printing of the stored facsimiles is performed automatically for the stored facsimiles corresponding to at least one of the print-priority numbers, and wherein the printing of the stored facsimiles is performed upon user request for the stored facsimiles corresponding to at least a different one of the print-priority numbers. In one embodiment of the first method, the plurality is at least three.

In one arrangement of the third method, the printing of the stored facsimiles is performed automatically only for the stored facsimiles corresponding to the highest print-priority number. It is noted that the previously described examples, illustrations, etc. of the first method, and the previously described enablements, employments, etc. of the second method, are equally applicable to the third method.

Several benefits and advantages are derived from at least one of the methods. In one example, wherein facsimiles are stored at night and stored facsimiles corresponding to higher print-priority numbers are printed at a preselected time in the morning before printing stored facsimiles corresponding to lower print-priority numbers, the more important faxes are printed first before the facsimile machine runs out of paper or other consumables. In one variation of the same example, having stored facsimiles corresponding to higher print-priority numbers print automatically at a preselected time in the morning and having stored facsimiles corresponding to lower (or no) print-priority numbers printed only upon user request allows facsimiles corresponding to lower (or no) print-priority numbers, such as unwanted facsimiles, not to be printed, thereby saving on consumables.

The foregoing description of several methods of the invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

What is claimed is:

1. A method for printing incoming facsimiles comprising:
   assigning a print-priority number to a plurality of known facsimile origination identification numbers, wherein the print-priority number is different for at least two of the plurality;
   identifying the facsimile origination identification number of incoming facsimiles to determine whether the incoming facsimile is an unknown or known facsimile origination identification number;
   storing the incoming facsimiles if from a known facsimile origination identification number assigned one of at least two different print-priority numbers; and
   printing the stored facsimiles, in an order based at least on their corresponding print-priority numbers.

2. The method of claim 1, wherein the facsimile origination identification number of the incoming facsimiles and the known facsimile origination identification numbers include caller ID information.

3. The method of claim 2, wherein the caller ID information includes one of a caller telephone number, a name, and both the caller telephone number and the name.

4. The method of claim 1, wherein the facsimile origination identification number of the incoming facsimiles and the known facsimile origination identification numbers include a facsimile header.

5. The method of claim 1, wherein the known facsimile origination identification numbers include at least one having at least one wildcard.

6. The method of claim 1, also including automatically printing the stored facsimiles corresponding to at least one of the print-priority numbers in order to make room for storing additional incoming facsimiles.

7. The method of claim 1, wherein the printing of the stored facsimiles is performed automatically for the stored facsimiles corresponding to at least one of the print-priority numbers and is performed upon user request for each stored facsimile corresponding to at least a different one of the print-priority numbers.

8. The method of claim 1, wherein the storing of the incoming facsimiles only stores a predetermined number of the most recent incoming facsimiles of each of at least one known facsimile origination identification number.

9. The method of claim 1, wherein the printing of the stored facsimiles only prints a predetermined number of the most recent incoming facsimiles of each of at least one known facsimile origination identification number.

10. The method of claim 1, wherein the plurality is at least three.

11. The method of claim 1 further comprising storing incoming facsimiles from unknown facsimile origination identification number.

12. The method of claim 11 further comprising printing the stored facsimile corresponding to the unknown facsimile origination identification number upon user request.

13. A method for printing incoming facsimiles comprising:
assigning a print-priority number to a plurality of known facsimile origination identification numbers, wherein the print-priority number is different for at least two of the plurality;
identifying the facsimile origination identification number of incoming facsimiles;
storing the incoming facsimiles if from a known facsimile origination identification number assigned one of at least two different print-priority numbers, wherein the storing of the incoming facsimiles is performed during a predetermined hold time period; and
printing the stored facsimiles in an order based at least on their corresponding print-priority numbers, wherein the printing of the stored facsimiles is performed at the end of the predetermined hold time period or earlier upon user request.

14. The method of claim 13, wherein the printing of the stored facsimiles is performed automatically at the end of the predetermined hold time period.

15. The method of claim 13, wherein the printing is performed automatically at the end of the predetermined hold time period for the stored facsimiles corresponding to at least one of the print-priority numbers.

16. The method of claim 13, wherein the printing of the stored facsimiles is performed upon user request at the end of the predetermined hold time period.

17. The method of claim 16, wherein the printing of the stored facsimiles is performed upon user request at the end of the predetermined hold time period for the stored facsimiles corresponding to at least one of the print-priority numbers.

18. The method of claim 13, wherein the predetermined hold time period begins at the close of one business day and ends at the beginning of the next business day.

19. The method of claim 13, wherein the plurality is at least three.

20. A method for printing incoming facsimiles comprising:
assigning a print-priority number to a plurality of known facsimile origination identification numbers, wherein the print-priority number is different for at least two of the plurality;
identifying the facsimile origination identification number of incoming facsimiles;
storing the incoming facsimiles if from a known facsimile origination identification number assigned one of at least two different print-priority numbers, wherein the storing of the incoming facsimiles is performed during a predetermined hold time period; and
printing the stored facsimiles in an order based at least on their corresponding print-priority numbers, wherein the printing of the stored facsimiles is performed at the end of the predetermined hold time period, wherein the printing of the stored facsimiles is performed automatically for the stored facsimiles corresponding to at least one of the print-priority numbers, and wherein the printing of the stored facsimiles is performed upon user request for the stored facsimiles corresponding to at least a different one of the print-priority numbers.

21. The method of claim 20, wherein the printing of the stored facsimiles is performed automatically only for the stored facsimiles corresponding to the highest print-priority number.

22. The method of claim 21, wherein the plurality is at least three.

* * * * *

UNITED STATES PATENT AND TRADEMARK OFFICE
CERTIFICATE OF CORRECTION

| | | |
|---|---|---|
| PATENT NO. | : 7,616,745 B2 | Page 1 of 1 |
| APPLICATION NO. | : 11/082083 | |
| DATED | : November 10, 2009 | |
| INVENTOR(S) | : Owens et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1274 days.

Signed and Sealed this

Nineteenth Day of October, 2010

David J. Kappos
*Director of the United States Patent and Trademark Office*